United States Patent [19]

Tsurusaki et al.

[11] Patent Number: 4,764,954
[45] Date of Patent: Aug. 16, 1988

[54] AUTOMATIC GAIN CONTROL IN A LOUDSPEAKER TELEPHONE SET

[75] Inventors: Masayuki Tsurusaki; Yasuji Sato; Takeshi Horiuchi, all of Tokyo; Hisashi Yamada, Kanagawa; Minoru Tanaka; Akira Maekawa, both of Tokyo, all of Japan

[73] Assignee: Kabushiki Kaisha Toshiba, Japan

[21] Appl. No.: 834,412

[22] Filed: Feb. 28, 1986

[30] Foreign Application Priority Data

Feb. 28, 1985 [JP] Japan ................... 60-39429

[51] Int. Cl.⁴ ............................................. H04M 9/08
[52] U.S. Cl. ...................................... 379/390; 379/388
[58] Field of Search ............... 179/81 B, 100 L, 170.2, 179/170.6, 170.8; 379/387, 388, 389, 390, 406, 407, 408, 409, 345

[56] References Cited

U.S. PATENT DOCUMENTS

| 3,461,240 | 8/1969 | Lindgren .................... 379/390 |
| 3,952,166 | 4/1976 | Kato et al. .................. 379/390 X |
| 4,002,854 | 1/1977 | Penrose ...................... 179/81 B |
| 4,161,624 | 7/1979 | Brosow ....................... 379/390 X |
| 4,317,959 | 3/1982 | Kuriki ........................ 179/81 B X |
| 4,513,177 | 4/1985 | Nishino et al. ............. 179/81 B |
| 4,527,014 | 7/1985 | Styrna ........................ 179/81 B |

FOREIGN PATENT DOCUMENTS 0094257 6/1983 Japan ................................ 379/390

*Primary Examiner*—Jin F. Ng
*Assistant Examiner*—Randall S. Vaas
*Attorney, Agent, or Firm*—Banner, Birch, McKie & Beckett

[57] ABSTRACT

A loud-speaker telephone set includes a switching control circuit to attenuate the incoming signal, during transmission, and to attenuate the outgoing signal, during reception, in order to prevent feedback from the loud-speaker to the microphone. An automatic gain control circuit is added which detects at least one of the incoming signal level and the outgoing signal level and which adjusts the attenuation of both the incoming and outgoing signals so as to reduce the attenuation change between reception and transmission below 20 dB and eliminate the unpleasant sensation, to a user, of large attenuation changes.

1 Claim, 6 Drawing Sheets

AUTOMATIC GAIN CONTROL IN A LOUDSPEAKER TELEPHONE SET

BACKGROUND OF THE INVENTION

This invention relates to a loudspeaker telephone set, that is, a telephone set which enables the user to engage in a hands-free telephone conversation. A conventional loudspeaker telephone set is shown in block diagram form in FIG. 1. Microphone 1 converts voice signals into electrical signals, which are amplified by microphone amplifier 2. Transmit attenuator 3 is controllable by means of a control signal to change the level of the outgoing signal, that is, the signal generated by microphone 1, between a high level (during transmission) and a low level (during reception). The outgoing signal after leaving attenuator 3 is amplified by power amplifier 4 and enters hybrid circuit 5. Hybrid circuit 5 is a type of directional coupler. Since it is desired that the outgoing signal from the microphone be applied only to telephone line 20 and not to the loudspeaker, and that the incoming signal from telephone line 20 be applied to the loudspeaker but not to the microphone, the hybrid circuit is inserted to maintain isolation between the incoming and outgoing signals. An incoming signal from telephone line 20, after passing through hybrid circuit 5, is amplified by receiving amplifier 6 and attenuated by receive attenuator 7, which functions in the same way as does transmit attenuator 3. Receive attenuator 7 changes the attenuation of the incoming telephone signal, in accordance with a control signal, between a high level (during reception) and a low level (during transmission). The attenuated incoming signal is then amplified by power amplifier 8 and converted into sound by loudspeaker 9.

As with a handset telephone, it would be desirable in the case of a loudspeaker telephone set to be able to speak and listen to a party at the same time; however, loudspeaker telephone sets are limited to simplex communication because of feedback, which results in a howling sound, caused by two factors: an imperfect isolation in the hybrid circuit and a non-zero coefficient of coupling between the microphone and the loudspeaker. Several amplifiers are placed in the outgoing signal path between microphone 1 and telephone line 20 in order to raise the outgoing signal to a satisfactory level. Several amplifiers are also placed in the incoming signal path between telephone line 20 and loudspeaker 9 to amplify the incoming signal to a satisfactory level to be heard. Consequently, the loop gain for the closed loop circuit including the microphone, the outgoing signal path, the hybrid circuit, the incoming signal path, the loudspeaker, and the acoustic coupling between the loudspeaker and the microphone, is far greater than 1 (0 dB). In the worst case, when the impedance mismatch in the hybrid circuit is at a maximum and the acoustic coupling between the loudspeaker and the microphone is the worst, the loop gain might reach 40 dB and cause howling. In order to prevent this, during transmission the gain of the incoming signal is decreased, while during reception the gain of the outgoing signal is decreased. Whether the telephone is transmitting or receiving, the attenuation of attenuators 3 and 7 is adjusted so that the loop gain remains below 0 dB.

A change in status from transmission to reception is accomplished automatically by voice switching. Transmitting detector 10 is connected to the output of microphone amplifier 2 to rectify the outgoing signal and detect its level. Similarly, receiving detector 11 is connected to the input of power amplifier 8 to rectify the incoming signal and detect its level. Switching signal generator 12 compares the level of the outgoing signal with the level of the incoming signal and generates a control signal to adjust the attenuation of attenuators 3 and 7. Switching signal generator 12 includes a time constant circuit, not shown, as its last stage. The time constant circuit causes the control signal to change gradually when the status of the loudspeaker telephone changes between transmission and reception.

In such a simplex communication system, when the status of the telephone set changes between transmission and reception, the level of the received voice sound typically changes by 40 dB. Thus, a sound level which is loud enough to hear during reception suddenly and markedly changes to such a low level that it cannot be heard at all when the status of the loudspeaker telephone changes from reception to transmission. A similar large (40 dB) change occurs in the other direction when the status of the telephone set changes from transmission to reception. This marked change in the sound level is very noticeable to the user and often gives him or her an unpleasant sensation, the degree of which depends upon the particular person. It is said generally that most people do not notice an unpleasant change if the difference between the transmission and reception sound levels is kept below 20 dB.

SUMMARY OF THE INVENTION

It is an object of the present invention to reduce the discomfort experienced by users of loudspeaker telephone sets when the sets switch between transmission and reception status.

Another object of the invention is automatically to control the incoming and outgoing signal levels in a loudspeaker telephone set.

The invention adds, to an ordinary loudspeaker telephone set, an automatic gain control (AGC) circuit and associated circuitry. The AGC circuit is connected to detect the incoming or outgoing signal and to control the attenuation of both the incoming and outgoing signals in such a manner that, when the level of the signal connected to the input of the AGC circuit exceeds a predetermined critical level (that corresponds to the lowest level in the range of normal voice signals), the attenuation of that signal (incoming or outgoing) is increased and the attenuation of the other signal (outgoing or incoming) is decreased.

DETAILED DESCRIPTION OF THE PREFERRED EMBODIMENT

Figure 1:
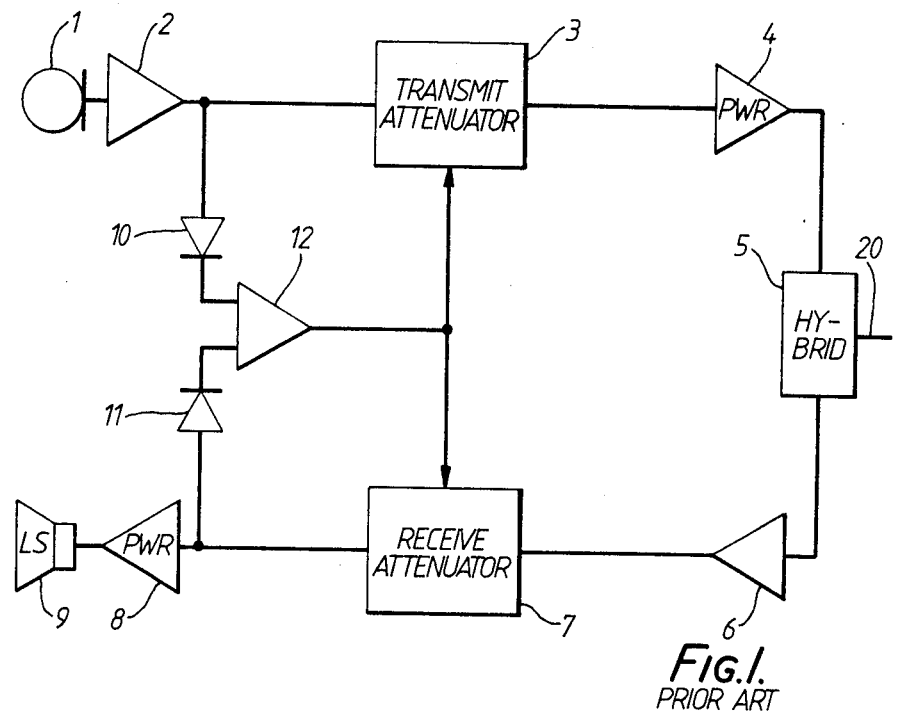
FIG. 1 is a block diagram of a prior art loudspeaker telephone set.
Figure 2:
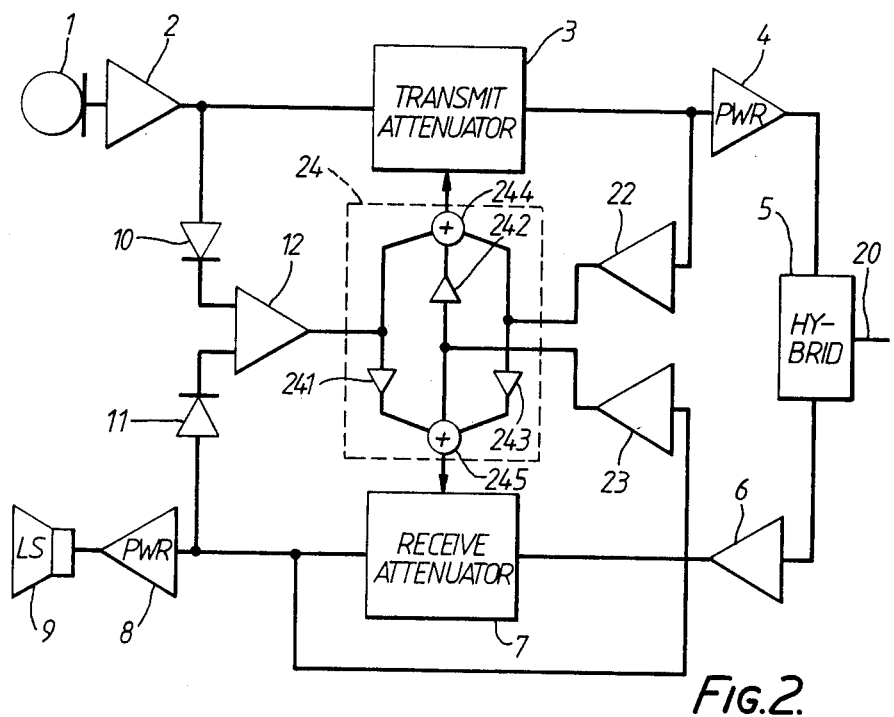
FIG. 2 is a block diagram of a loudspeaker telephone set in accordance with the invention.

FIG. 2 is a block diagram of a loudspeaker telephone set in accordance with the present invention. It includes microphone 1, microphone amplifier 2, transmit attenuator 3, power amplifier 4, hybrid circuit 5, receiving amplifier 6, receive attenuator 7, loudspeaker power amplifier 8, loudspeaker 9, transmitting detector 10, receiving detector 11, and switching signal generator 12. Amplifiers 2, 4, 6 and 8 all have a fixed amplification. Attenuators 3 and 7 are controllable.

In addition to these elements, the invention includes transmitting AGC circuit 22, receiving AGC circuit 23, and attenuation control signal network 24. Network 24 includes inverters 241-243 and adders 244 and 245.

Figure 3:
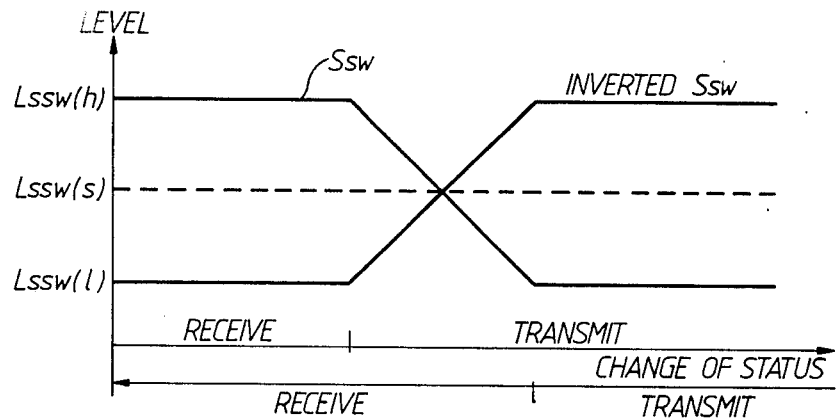
FIG. 3 is a graph showing the level of the switching signal (and its inverse) generated by the switching signal generator of FIG. 2.

FIG. 3 is a diagram showing the level of the switching signal generated by switching signal generator 12 in FIG. 2. This signal is high Lssw(h) when the incoming signal level, detected by detector 11, is higher than the outgoing signal level, detected by detector 10. It is low Lssw(l) when the incoming signal level is lower than that of the outgoing signal.

Figure 4:
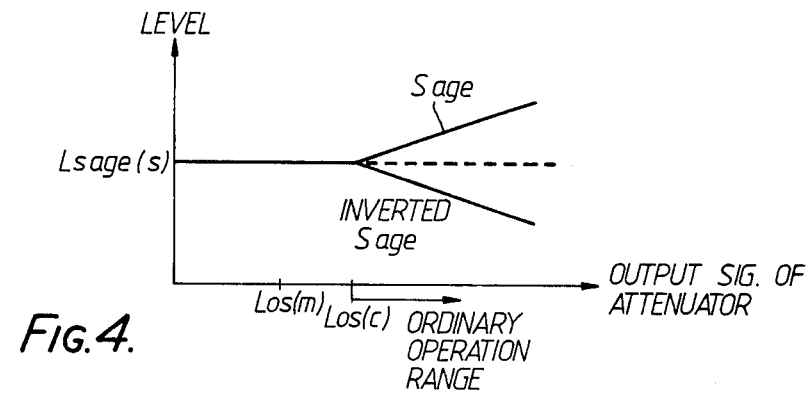
FIG. 4 is a graph showing the input-output characteristic (and its inverse) of the automatic gain control circuits of FIG. 2.

Transmitting AGC 22 is connected to the output terminal of transmit attenuator 3, and receiving AGC 23 is connected to the output terminal of receive attenuator 7. Transmitting AGC 22 and receiving AGC 23 each generate an AGC signal having a level depending on the signal level emerging from the respective attenuator. Transmitting AGC 22 and receiving AGC 23 are identical; however, in general they need not be. The input-output characteristic of transmitting AGC 22 (and receiving AGC 23) is shown as Sagc in FIG. 4. In FIG. 4 the horizontal axis shows the input signal level of transmitting AGC 22 (receiving AGC 23), that is, the output signal of transmit attenuator 3 (receive attenuator 7). Point Los(m) corresponds to the minimum level of outgoing signal (incoming signal) based on specifications. Point Los(c) corresponds to the critical level of outgoing signal (incoming signal) which is the lowest level in the range of ordinary transmission (reception). Most transmission and reception occur in this range as long as a user does not speak too softly and as long as the telephone network is in good condition. In FIG. 4 the vertical axis shows the output signal level of transmitting AGC 22 (receiving AGC 23). Point Lsagc(s) shows an arbitrary level; output signal Sagc is at the level Lsagc(s) when the input signal to transmitting AGC 22 (receiving AGC 23) is at or below the level Los(c). When the input signal to transmitting AGC 22 (receiving AGC 23) is above Los(c), output signal Sagc is above the level Lsagc(s). The higher the output signal of transmitting AGC 22 (receiving AGC 23), the higher the output signal level Sagc.

Figure 5:
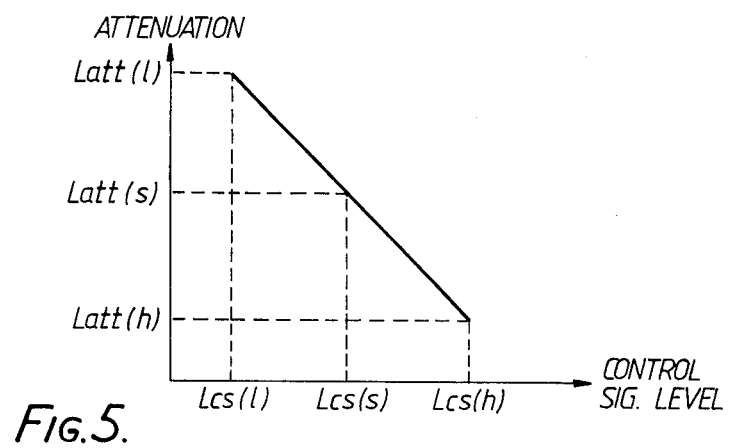
FIG. 5 is a graph showing the relationship between control signal level and degree of attenuation for the attenuators of FIG. 2.
Figure 6:
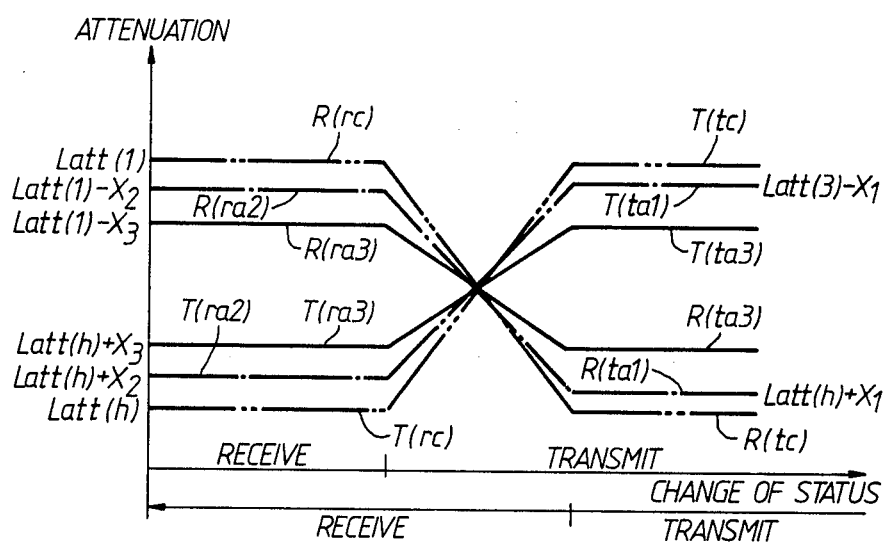
FIG. 6 is a graph showing the level of the attenuation control signals applied to the attenuators of FIG. 2 under various circumstances.

Attenuation control signal network 24 combines the output signals of switching signal generator 12, transmitting AGC 22 and receiving AGC 23, and applies the combined signal to transmitting attenuator 3 and receiving attenuator 7 as control signals. However, the control signals must cause the attenuation of transmitting attenuator 3 and receiving attenuator 7 to change in opposite directions. Transmitting attenuator 3 and receiving attenuator 7 are identical. The input-output characteristic of transmitting attenuator 3 and receiving attenuator 7 is shown in FIG. 5, where the horizontal axis indicates control signal level and the vertical axis indicates attenuation. As is clear from this Figure, attenuation is low Latt(l) when the control signal level is high Lcs(h), and vice versa. For example, Latt(l), Latt(s) and Latt(h) are 0 dB, −20 dB and −40 dB, respectively. Attenuation control signal network 24 includes three identical inverters 241, 242 and 243 which respectively invert the output signals of switching signal generator 12, transmitting AGC 22 and receiving AGC 23 about the levels Lssw(s), Lsagc(s) and Lsagc(s). Network 24 also includes two identical adders. Adder 244 combines the output signals of switching signal generator 12, inverter 242 and transmitting AGC 22, while adder 245 combines the output signals of inverter 241, transmitting AGC 23 and inverter 243. In this way attenuation control signals for transmitting attenuator 3 and receiving attenuator 7 are generated. Therefore, in the case of reception, during which switching signal Ssw is high, the attenuation of receiving attenuator 7 is low and that of transmitting attenuator 3 is high. On the other hand, in the case of transmission, when switching signal Ssw is low, the attenuation of transmitting attenuator 3 is low and that of receiving attenuator 7 is high. This is the basic operation of voice switching as shown in FIG. 6 by the double dotted dashed lines.

According to the present invention additional control is provided by the automatic gain control circuits. When the level of the voice signal being detected is at or above the critical level, the automatic gain control circuit increases the attenuation of that signal and decreases the attenuation of the other signal, as shown in FIG. 6 by the single dot and dashed line, or by the solid line.

Figure 7A:
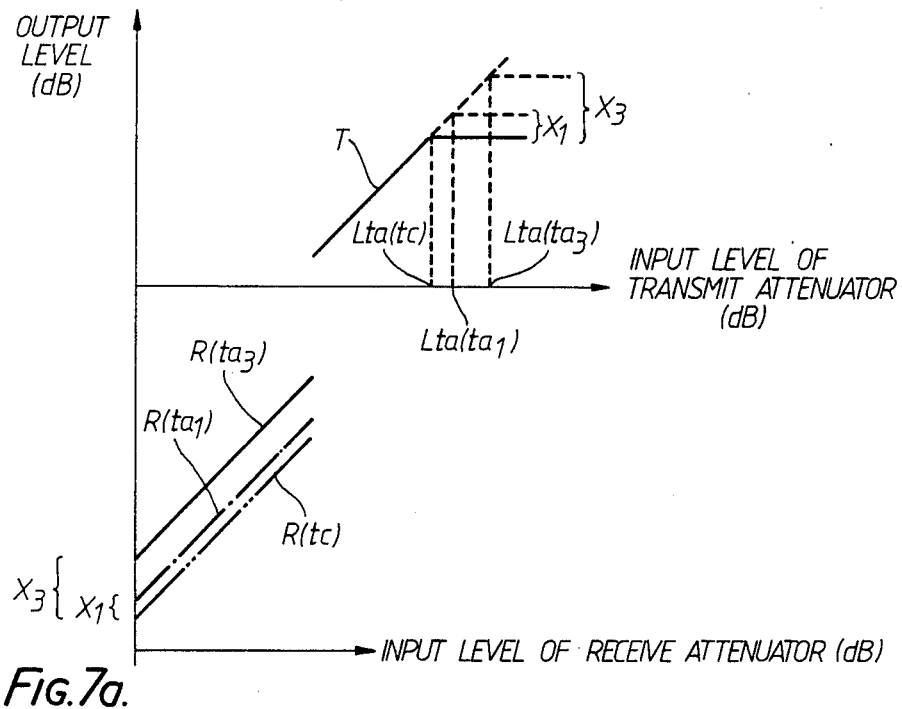
FIG. 7a is a graph showing the input-output characteristics of the attenuators of FIG. 2 when the loudspeaker telephone set is transmitting.
Figure 7B:
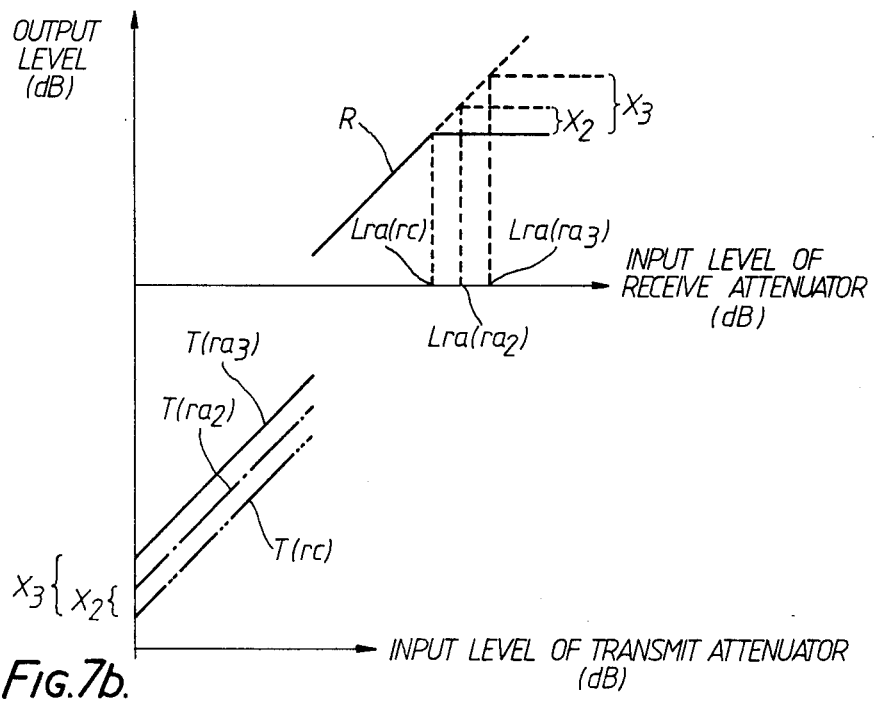
FIG. 7b is a graph showing the input-output characteristics of the attenuators of FIG. 2 when the loudspeaker telephone set is receiving.

FIG. 7a shows input-output characteristics of transmitting attenuator 3 and receiving attenuator 7 when the telephone of FIG. 2 is in the status of transmission. The upper horizontal axis shows the input signal level to transmitting attenuator 3, and point Lta(tc) shows the level corresponding to the critical level of transmitting signal mentioned above. The lower horizontal axis shows the input signal level to receiving attenuator 7. The vertical axis shows the output level of transmitting attenuator 3 and receiving attenuator 7. When the input of transmitting attenuator 3 is lower than level Lta(tc), its output level is approximately proportional to the input level. Then R(tc) is the characteristic of the receiving attenuator. At this time neither receiving AGC 23 nor transmitting AGC 22 is within its ordinary operation range. On the other hand, if the input to the transmitting attenuator rises above level Lta(tc), its output level remains constant. When the input level is, for example, Lta(ta1) or Lta(ta3), the characteristic of the receiving attenuator is shown by R(ta1) or R(ta3), respectively. R(ta1) and R(ta3) show that the attenuation of receiving attenuator 7 is reduced by an amount X1 or X3, the same as the amount of increase of attenuation of transmitting attenuator 3. This is the function of transmitting AGC 22. FIG. 7b shows input-output characteristics of receiving attenuator 7 and transmitting attenuator 3 when the telephone of FIG. 2 is in the status of reception. The operation of receiving AGC 23 is the same as that of transmitting AGC 22.

Referring to FIG. 6 again, in this figure, time is indicated on the horizontal axis. T(tc), T(ta1) and T(ta3) in FIG. 6 show the attenuation of transmitting attenuator 3 at the time when its average input level is Lta(tc), Lta(ta1) and Lta(ta3) in FIG. 7a, respectively, during transmission. The corresponding attenuation of receiving attenuator 7 is R(tc), R(ta1) and R(ta3), respectively. R(rc), R(ra2) and R(ra3) in FIG. 6 show the attenuation of receiving attenuator 7 at the time when its average of input level is Lra(rc), Lra(ra2) and Lra(ra3) in FIG. 7b, respectively, during reception. The corresponding attenuation of transmitting attenuator 3 is T(rc), T(ra2) and T(ra3), respectively. So, if the status changes from transmission, in which the level of the outgoing signal is below the critical level, to reception, in which the level of the incoming signal is below the critical level, the change of attenuation of receiving attenuator 7 amounts to Latt(l)−Latt(h)) because neither transmitting AGC 22 nor receiving AGC 23 is within its ordinary operation range. This amount Latt(l)−Latt(h)) is as large as 40 dB, for example, and causes the user to feel uncomfortable. However, this is a rare case. Usually the outgoing and incoming signals are in the ordinary range of level in which transmitting AGC 22 and receiving AGC 23 operate. For example, if the outgoing signal level corresponds to Lta(ta1) in the status of transmission and the incoming signal level corresponds to Lra(ra3) in the status of reception, the change of attenuation of receiving attenuator 7 amounts to ((Latt(l)−X3)−(Latt(h)+X1)). This amount is reduced by (X1+X3) as compared with that of the rare case mentioned above. And, for example, if the status changes from reception in which the level of the incoming signal corresponds to Rra(ra2) to the status of transmission in which the level of the outgoing signal corresponds to Tta(ta1), the change of attenuation of receiving attenuator 7 amounts to ((Latt(l)−X2)−Latt(h)+X1)), which is reduced by (X1+X2) as compared with that of the rare case. This reduced amount of change of attenuation of receiving attenuator 7 eliminates the uncomfortable sensation for most users.

Furthermore, the change of attenuation of transmitting attenuator 3 in the example described above is in the amounts ((Latt(l)−X1)−(Latt(h)+X3)), ((Latt(l)−X1)−(Latt(h)+X2)), respectively. These reduced changes of attenuation of transmitting attenuator 3 eliminates any possibility of discomfort to users of telephones connected to the loudspeaker telephone set.

Figure 8:
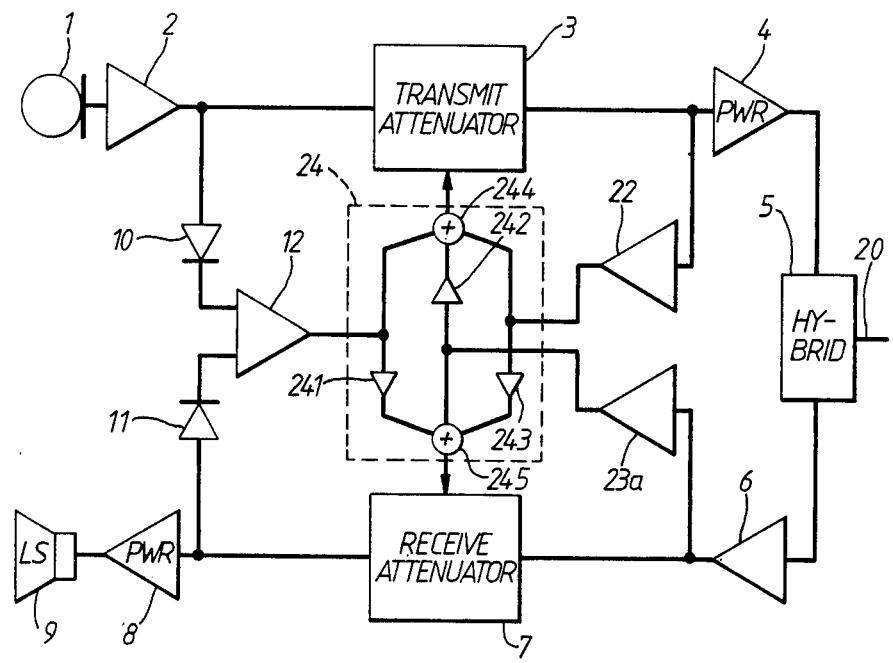
FIG. 8 is a block diagram of a loudspeaker telephone set in accordance with the second embodiment of the invention.

In the second embodiment of the present invention, shown in FIG. 8, the input terminal of receiving AGC 23a is connected to the input terminal of receiving attenuator 7 rather than its output terminal. However, the operation is the same as that of the previous embodiment though receiving AGC 23a has a characteristic slightly different from that of the first embodiment. The second embodiment is easier to design because of the wide dynamic range of the input signal of receive attenuator 7.

Figure 9:
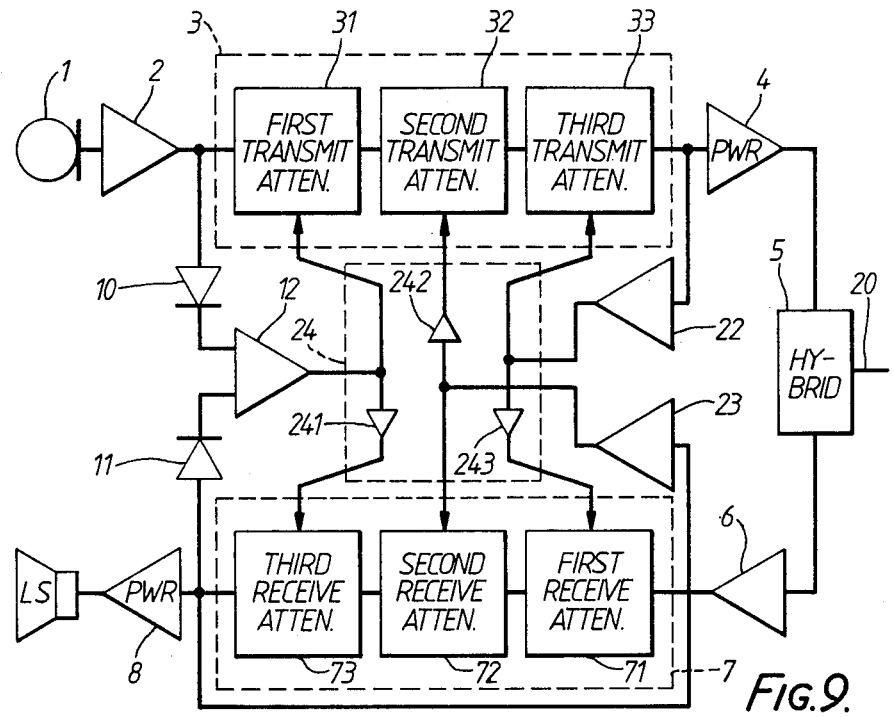
FIG. 9 is a block diagram of a loudspeaker telephone set in accordance with the third embodiment of the invention.

In the third embodiment of the present invention, shown in FIG. 9, transmit attenuator 3 has been divided into three transmit attenuators 31, 32 and 33, the operation of which are controlled by the outputs of switching signal generator 12, receiving AGC 23 and transmitting AGC 22, respectively. And receive attenuator 7 is similarly divided into three receive attenuators 71, 72 and 73, the operation of which are controlled respectively by the outputs of transmitting AGC 22, receiving AGC 23 and switching signal generator 12. In the third embodiment, adjustment of the attenuators is easier because it is done for each one independently.

Figure 10:
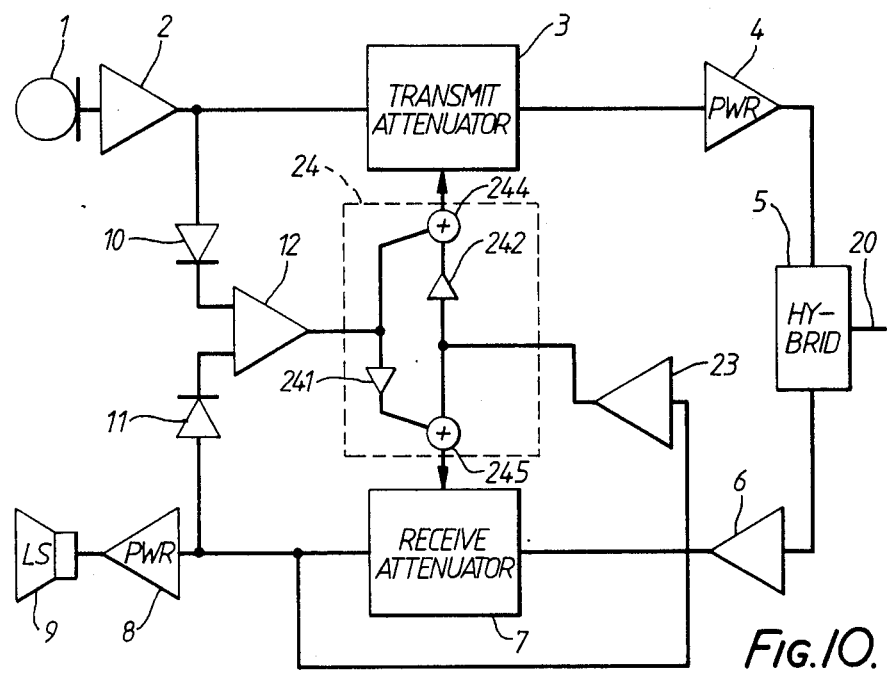
FIG. 10 is a block diagram of a loudspeaker telephone set in accordance with the fourth embodiment of the invention.

In the fourth embodiment, shown in FIG. 10, the transmitting AGC has been eliminated. However, the benefits of the invention are still available due to the presence of receiving AGC 23.

Although illustrative embodiments of the present invention have been described in detail with reference to the accompanying drawings, it is to be understood that the invention is not limited to those precise embodiments, and that various changes and modifications may be effected therein by one skilled in the art without departing from the scope or spirit of the invention.

We claim:

1. A loudspeaker telephone set comprising:
a microphone to develop an outgoing signal;
transmitter amplifier means for amplifying the outgoing signal;
first transmitting attenuator means for attenuating the outgoing signal in accordance with a transmit switch control signal;
second transmitting attenuator means coupled to said first transmitting attenuator means for attenuating the outgoing signal in accordance with a first transmit gain control signal;
third transmitting attenuator means coupled to said first and second transmitting attenuator means for attenuating the outgoing signal in accordance with a second transmit gain control signal;
a hybrid circuit to deliver the outgoing signal to a telephone line and to recover an incoming signal from the telephone line;
receiver amplifier means for amplifying the incoming signal;
first receiving attenuator means for attenuating the incoming signal in accordance with a receive switch control signal;
second receiving attenuator means coupled to said first receiving attenuator means for attenuating the incoming signal in accordance with a first receive gain control signal;
third receiving attenuator means coupled to said first and second receiving attenuator means for attenuating the incoming signal in accordance with a second receive gain control signal;
a loudspeaker to convert the incoming signal to sound;
a switching control circuit responsive to the outgoing signal and to the incoming signal to generate the transmit and receive switch control signals;
first gain control means responsive to the incoming signal for generating the first transmit and receive gain control signals to decrease the attenuation of said second transmitting attenuator means and to increase the attenuation of said second receiving attenuator means when the level of the incoming signal is higher than a first reference level, said first gain control means responsive to the incoming signal after said signal has been attenuated by said first, second and third receiving attenuator means; and second gain control means responsive to the outgoing signal for generating the second transmit and receive gain control signals to increase the attenuation of said third transmitting attenuator means and to decrease the attenuation of said third receiving attenuator means when the level of the outgoing signal is higher than a second reference level, said second gain control means responsive to the outgoing signal after said signal has been attenuated by said first, second and third transmitting attenuator means.

* * * * *